(12) United States Patent
Koh

(10) Patent No.: US 7,121,516 B1
(45) Date of Patent: Oct. 17, 2006

(54) CLAMPING STAND

(76) Inventor: Tuang-Hock Koh, P.O. Box 697, Fongyuan City, Taichung County (TW) 420

( * ) Notice: Subject to any disclaimer, the term of this patent is extended or adjusted under 35 U.S.C. 154(b) by 17 days.

(21) Appl. No.: 11/049,944

(22) Filed: Feb. 4, 2005

(51) Int. Cl.
*A47K 96/00* (2006.01)

(52) U.S. Cl. .............................. 248/226.11; 248/227.2; 248/231.61; 248/917; 269/219

(58) Field of Classification Search ............ 248/227.2, 248/226.11, 231.61, 251, 917, 921, 922, 923; 24/525, 569; 269/91, 219, 240
See application file for complete search history.

(56) References Cited

U.S. PATENT DOCUMENTS

| 100,571 | A | * | 3/1870 | Watson | 126/333 |
|---|---|---|---|---|---|
| 224,687 | A | * | 2/1880 | Hewes | 248/462 |
| 2,731,224 | A | * | 1/1956 | MacDonald | 248/511 |
| 3,131,927 | A | * | 5/1964 | Penix | 269/91 |
| 3,944,178 | A | * | 3/1976 | Greenwood | 248/231.61 |
| 4,113,218 | A | * | 9/1978 | Linder | 248/291.1 |
| 4,149,694 | A | * | 4/1979 | Verini | 248/539 |
| 4,373,639 | A | * | 2/1983 | Tricon | 211/119.005 |
| 4,562,987 | A | * | 1/1986 | Leeds et al. | 248/278.1 |
| 4,844,388 | A | * | 7/1989 | Kuba et al. | 108/5 |
| 5,014,950 | A | * | 5/1991 | Ohman et al. | 248/231.61 |
| 5,320,313 | A | * | 6/1994 | Crowe | 248/231.61 |
| 6,023,800 | A | * | 2/2000 | Stickley | 5/621 |

* cited by examiner

*Primary Examiner*—Korie Chan

(57) ABSTRACT

An improved clamping stand includes a clamp clamping the leaf of a desk and composed of an upper clamping plate and a lower clamping plate which are connected by a bolt and a pair of adjustable threaded rods with a C-shaped guard plate engaged therebetween, a pair of identical cushions respectively disposed on the inner surface of the upper and lower clamping plate for preventing the surfaces of the leaf from damaged and a tubular upright having a lower end connected to a top of the upper clamping plate and an upper end capable of supporting a LCD screen, a document board and/or a book tray which is supported by a pair of clamping stands synchronously, wherein the pair of threaded rods can adjust the oblique angle of the tubular upright.

3 Claims, 8 Drawing Sheets

CLAMPING STAND

BACKGROUND OF THE INVENTION

The present invention relates to the stationery and more particularly to an improved clamping stand which is clamped onto the leaf of a desk and provides more stable and a beautiful outlook.

A clamping stand clamped the leaf of a desk can support many things such as a table lamp, a document board, a LCD screen, and/or a book tray, etc. FIG. 1 shows a prior art clamping stand 10 which comprises a U-shaped clamping plate 11, an upright 12 centrally projected upward from the top of a clamping plate 11, a protrudent screw hole 13 centrally projected downward from the underside of the clamping plate 11, a threaded shank 14 engaged into the protrudent screw hole 13 which is fastened by rotating a T-shaped handle 142. The clamping stand 10 further has a pad 141 disposed between the underside of the leaf and the clamping plate 11. However, this type of clamping plate 11 always damages the upper surface of the leaf 15 and the shank 14 in addition to the T-shaped handle always expose out under the leaf 15 that brings inconvenience and non-beautification to the people. Further, if the clamping plate 11 is fastened too tight, the upper surface of the leaf 15 shall be damaged. Otherwise, it may be breakaway.

SUMMARY OF THE PRESENT INVENTION

The present invention has a main object to provide an improved clamping stand which coin sides with other apparatuses in an office in order to present uniform beautification.

Another object of the present invention is to provide an improved clamping stand which will not damage the surface of the leaf because of that the shank is not directly touched the surface of the leaf.

Further object of the preset invention is to provide an improved clamping stand which is obliquely adjustable relative to the surface plane of the leaf.

Accordingly, the improved clamping stand of the present invention comprises generally a clamp which is composed of an upper plate and a lower plate connected by a pair of screws and protected by a C-shaped safety plate. Each of the upper and lower plates has a pad and a cushion which are provided to prevent the clamp from damaging the surfaces of the leaf and a tubular upright connected to a central top of the upper plate by screws. A bolt inserts into a circular hole of the upper plate and fastens into a screw hole of the lower plate. It is characterized that a pair of the thread rods which connect the upper and the lower plates can rotatably adjust the oblique angle of the upright and the top of the upright is capable of supporting different office apparatuses.

The present invention will become more fully understood by reference to the following detailed description thereof when read in conjunction with the attached drawings.

DETAILED DESCRIPTION OF THE PREFERRED EMBODIMENT

Figure 1:
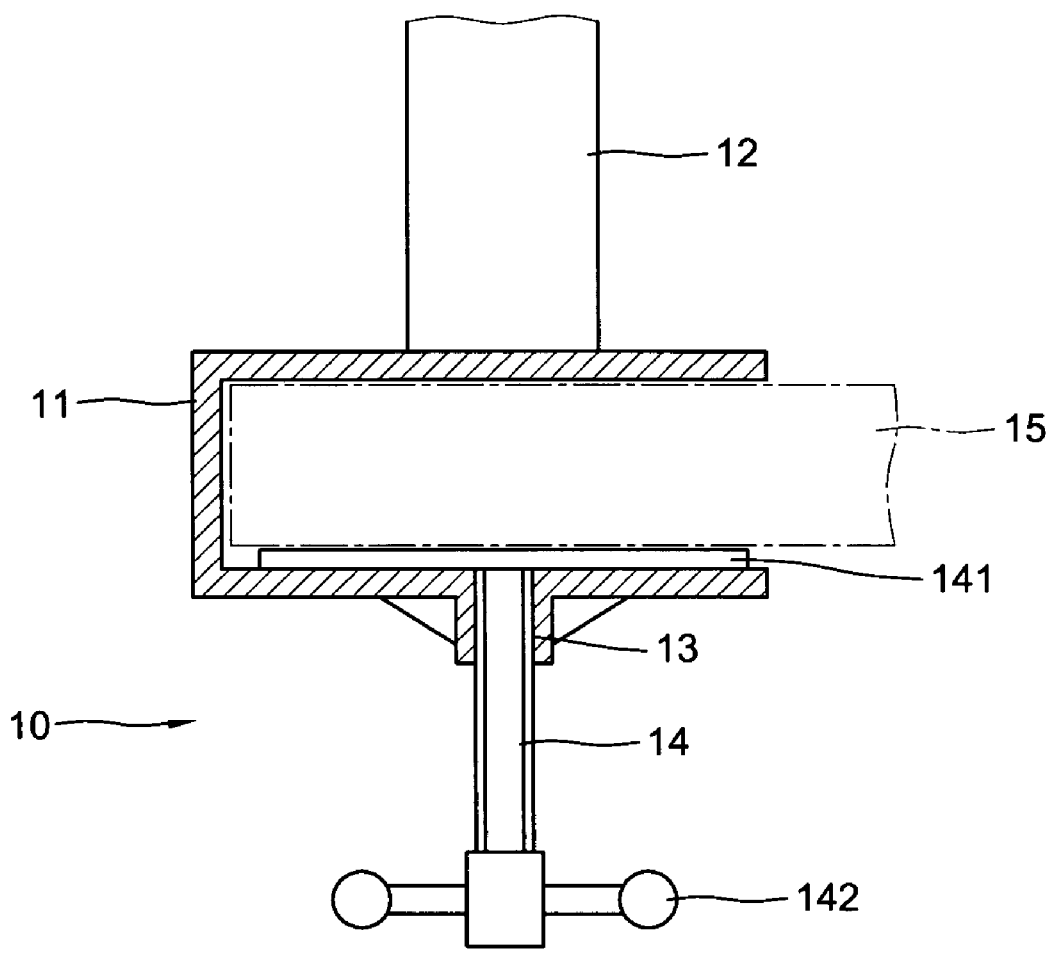
FIG. 1 is a sectional view of a clamping stand according to a prior art.
Figure 2:
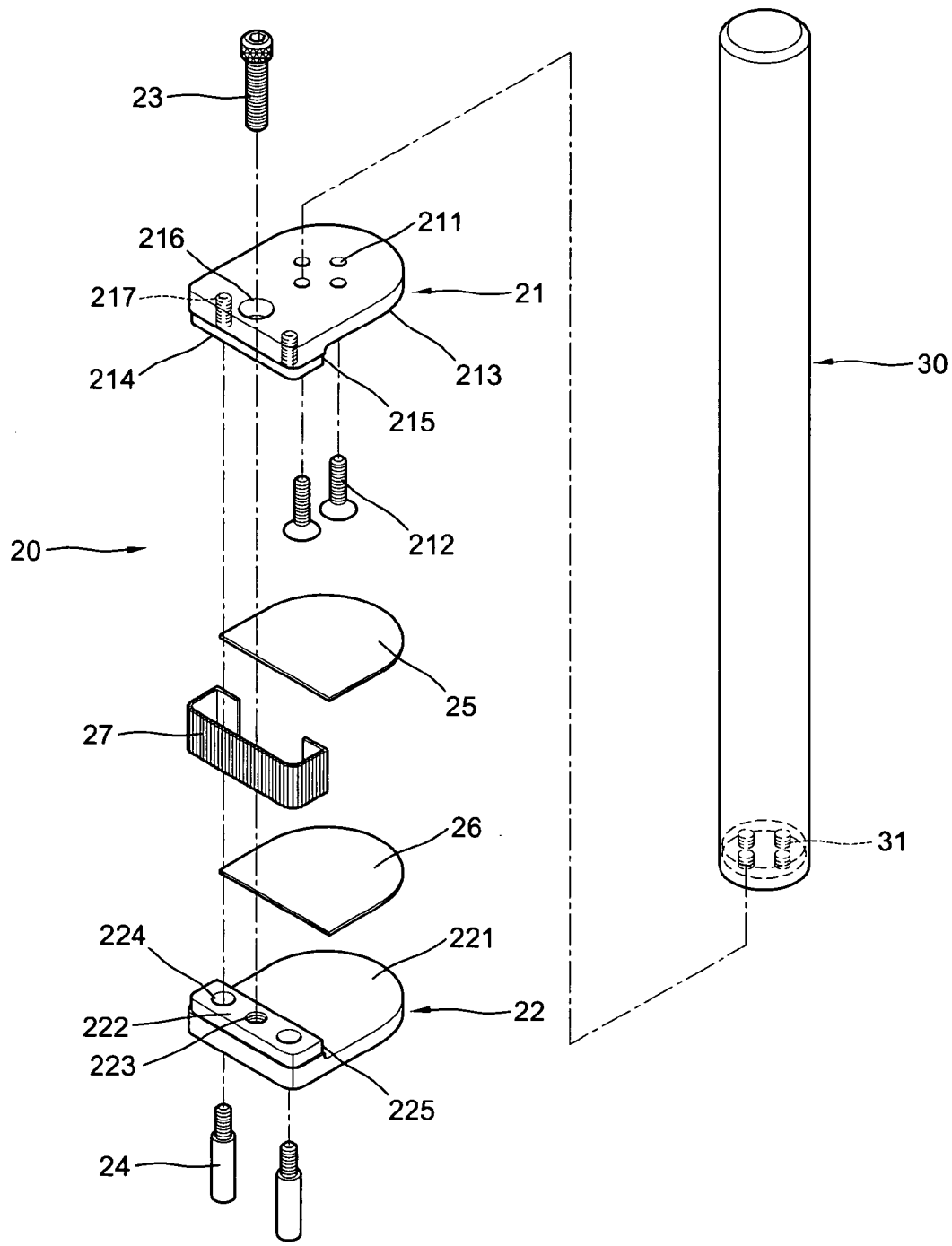
FIG. 2 is an exploded perspective to show a preferred embodiment of a clamping stand according to the present invention.
Figure 3:
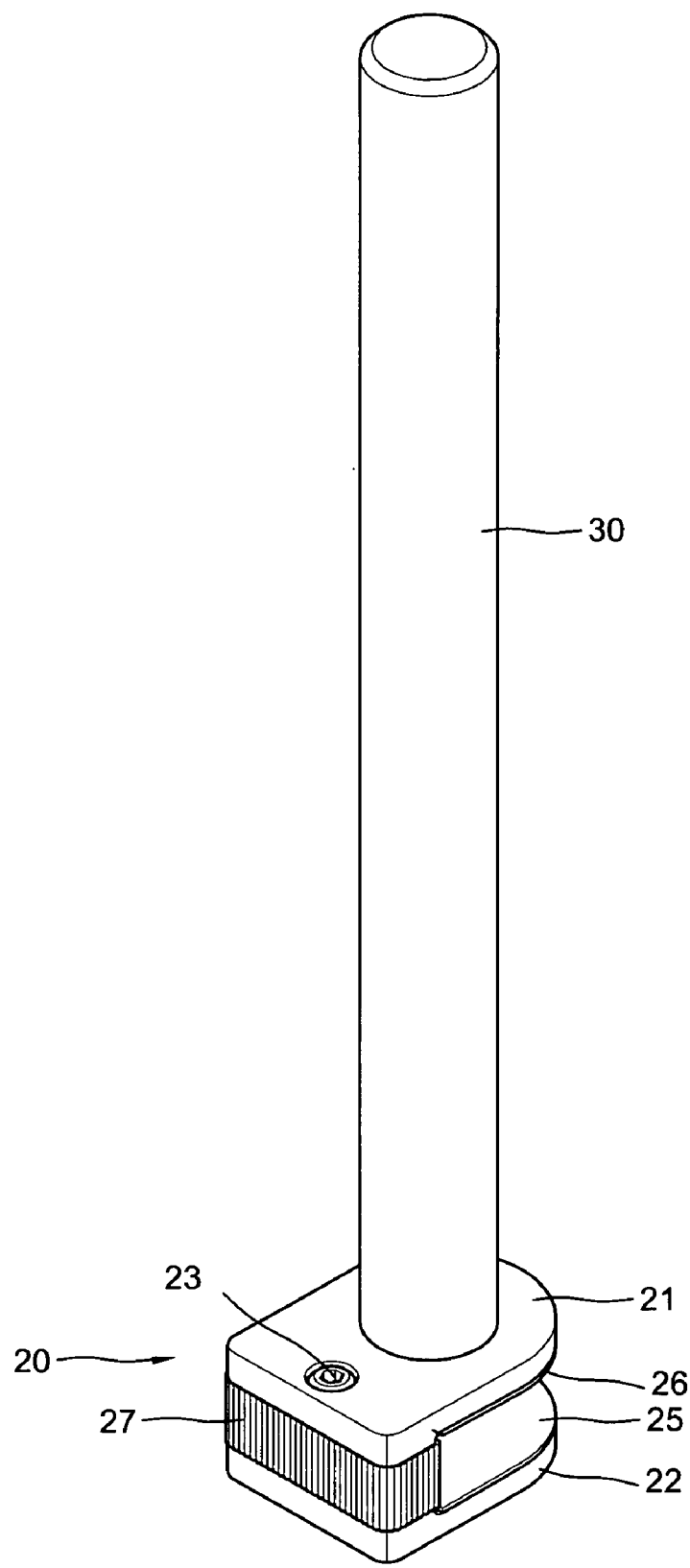
FIG. 3 is a perspective to show the assembly of FIG. 2.
Figure 4:
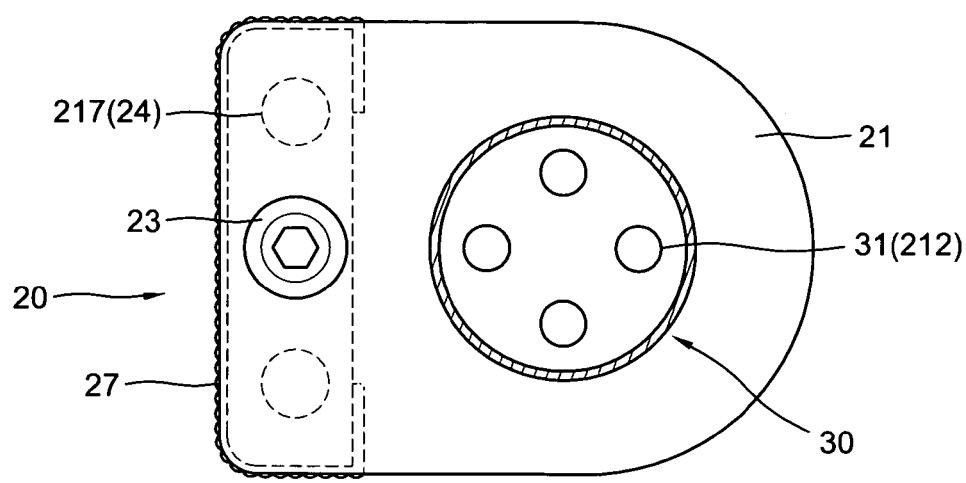
FIG. 4 is a top view of FIG. 3.
Figure 5:
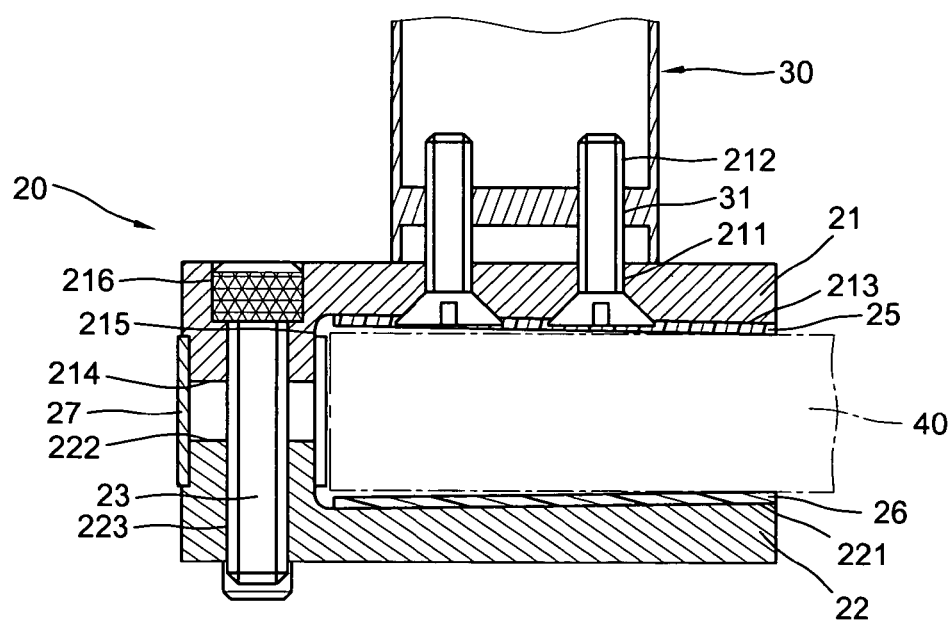
FIG. 5 is a longitudinal section to show the details of the present invention.
Figure 6:
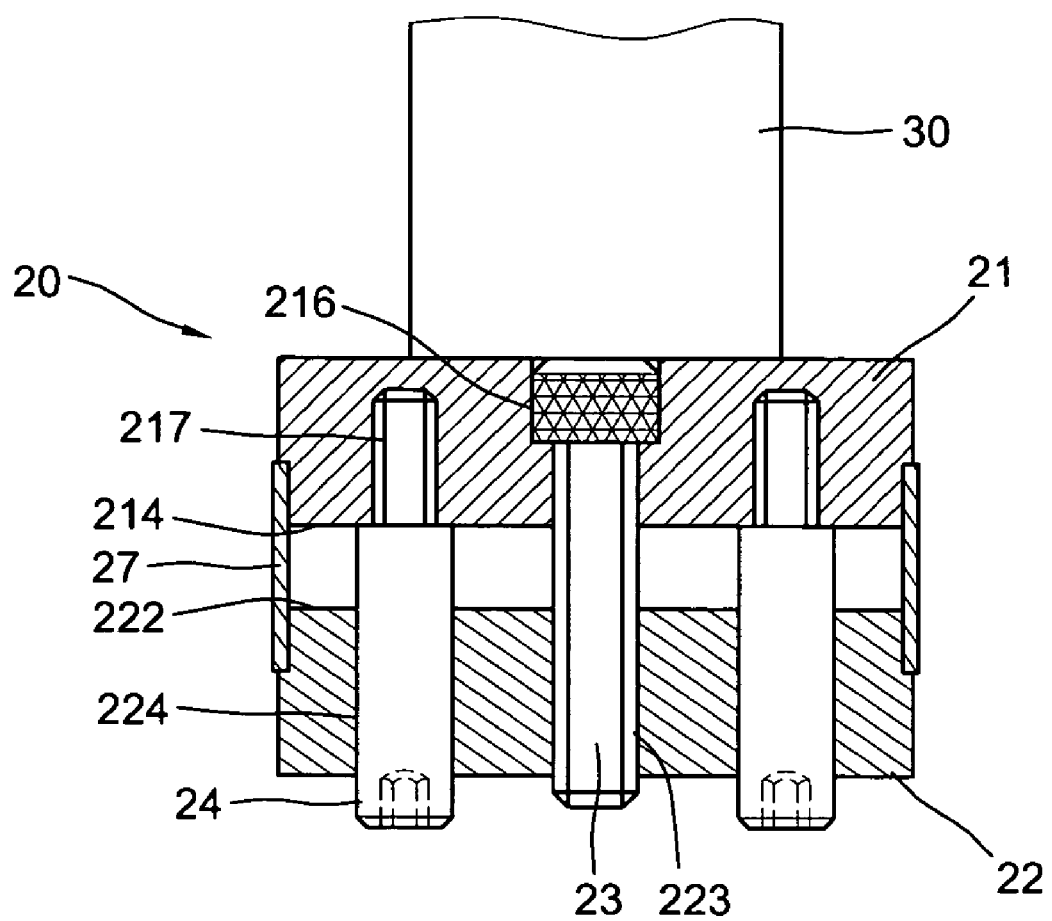
FIG. 6 is a cross section to show the details of the present invention.
Figure 7:
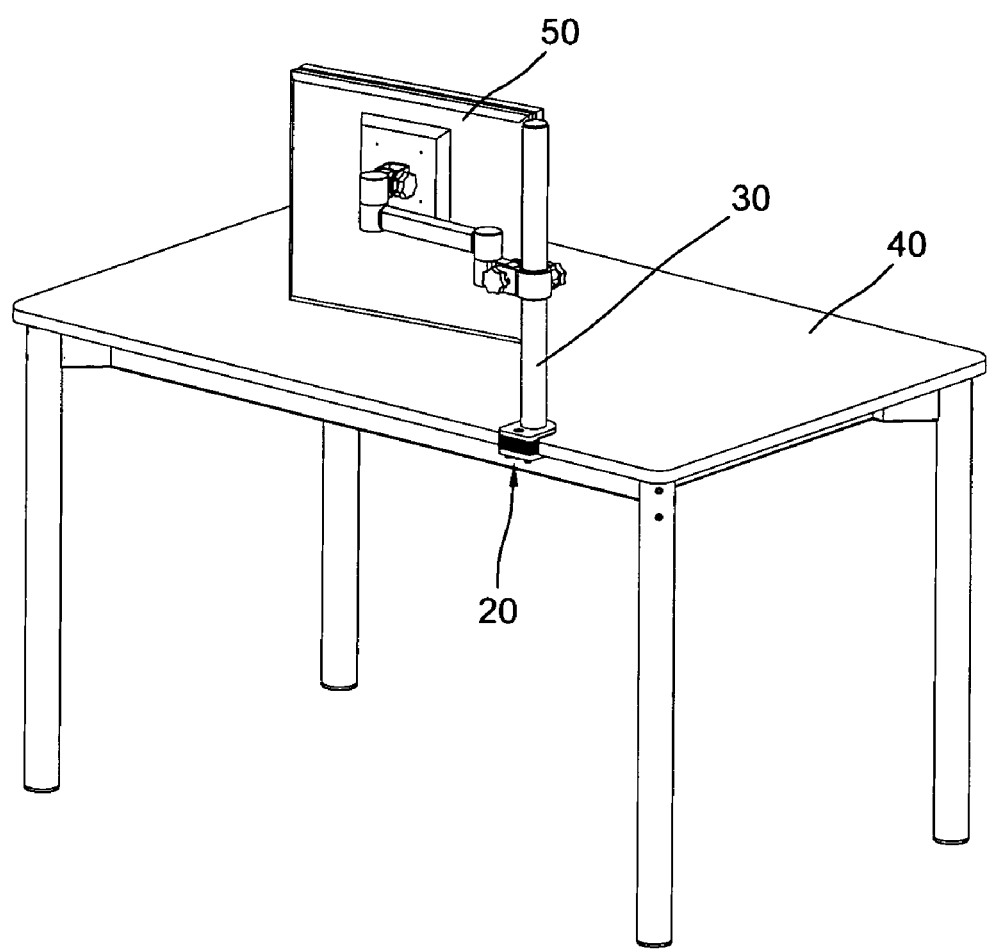
FIG. 7 is a perspective view to show that the clamping stand is clamped on an edge of the leaf of a desk and a LCD screen mounts on the upper portion of the tubular upright.
Figure 8:
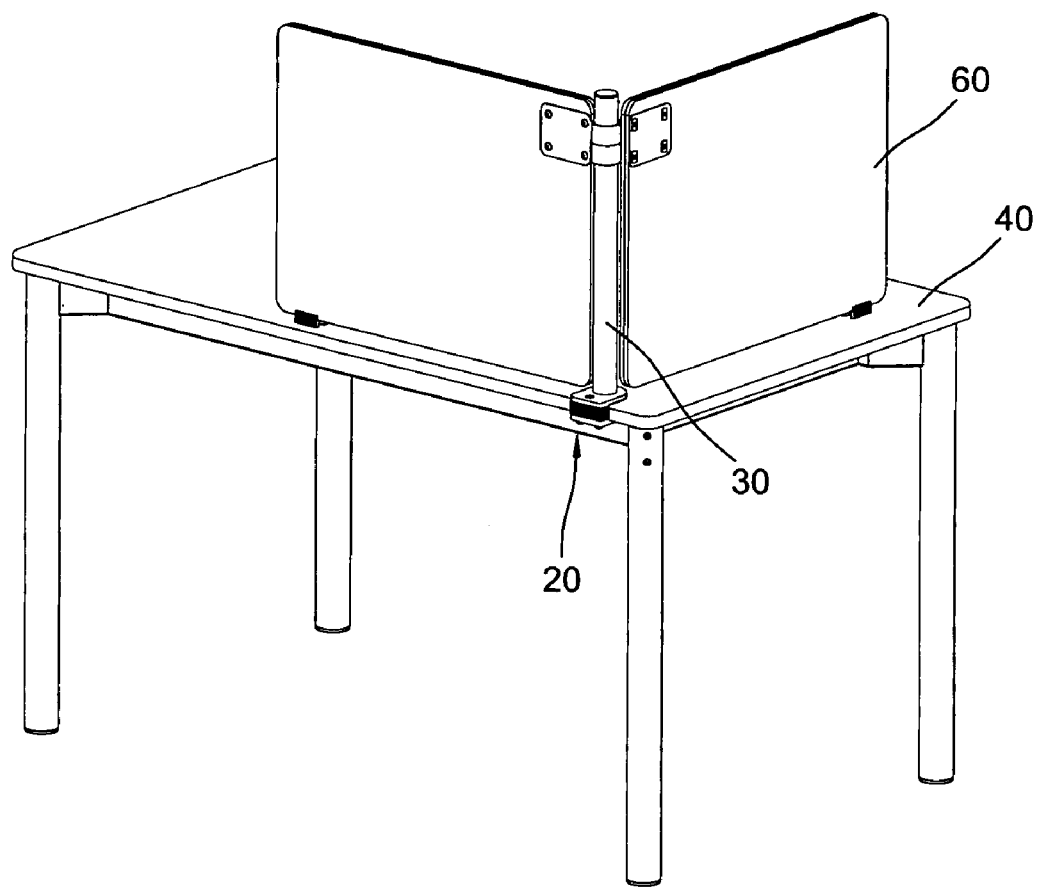
FIG. 8 is a perspective view to show a document board mounts onto the upright of the clamping stand.
Figure 9:
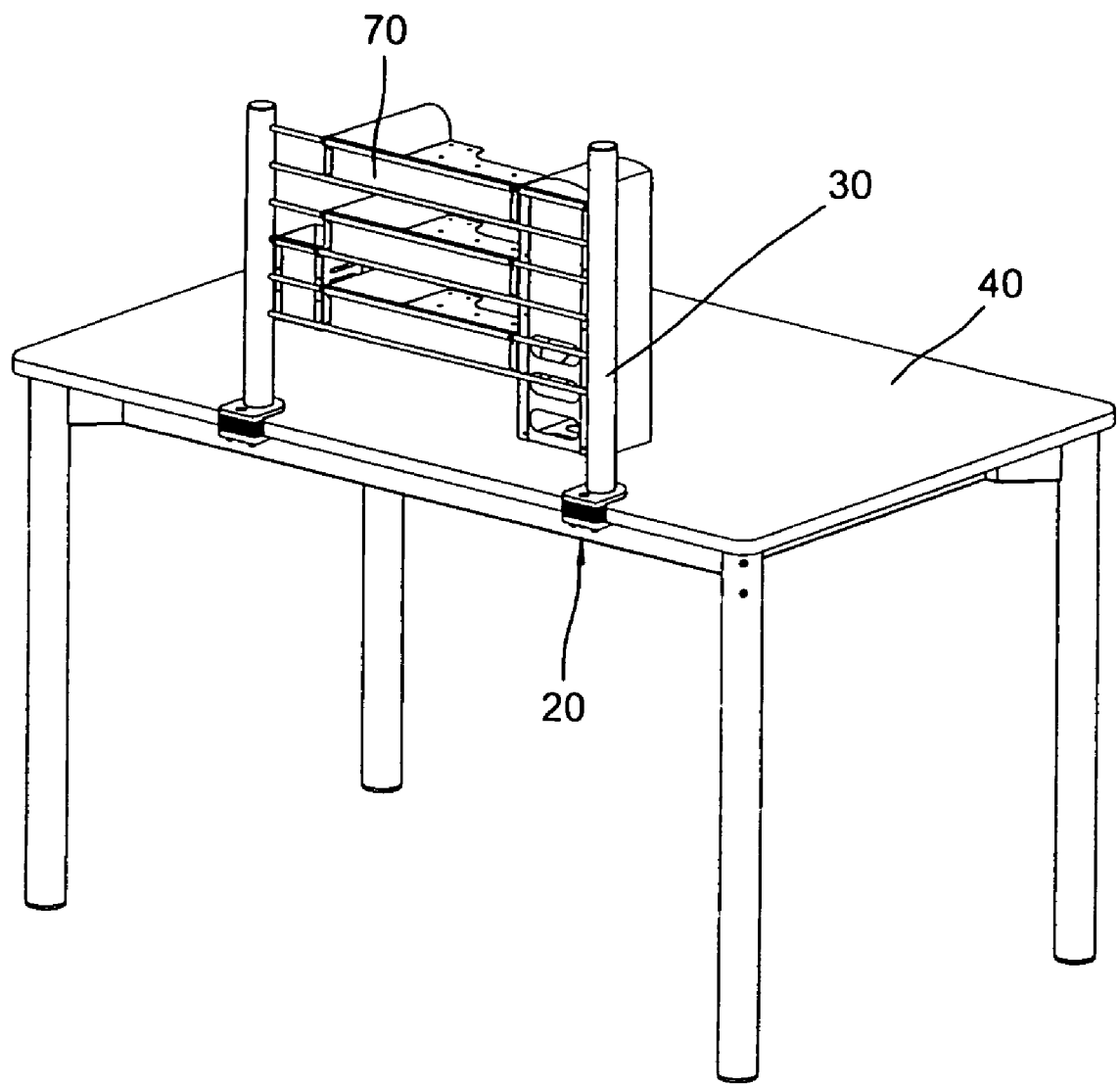
FIG. 9 is a sectional view to show a pair of the clamping stands of the present invention are used to support a book tray.

With reference to the drawings and initiated from FIGS. 2 to 6, the improved clamping stand of the present invention comprises a clamp 20 which has an upper plate 21 including an arcuate end, a straight end, a plurality of through holes 211 in a center of the upper plate 21 for connecting a tubular upright 30 which has a plurality of screw holes 31 in a partitioned lower end aligned with the through holes 211 of the upper plate 21 and secured by a plurality of screws 212, a thin clamping portion 213, a thick straight portion 215, a rectangular pad 214 under of thick straight portion 215, a circular through hole 216 in a center of the thick straight portion 215 through the pad 214 and a pair of screw holes spacedly formed in the thick straight portion 215 also through the pad 214. The lower plate 22 has a shape corresponding to the upper plate 21 having a thin arcuate portion 221, a thick straight portion 225 on which is a rectangular pad 222, a screw hole 223 in the center of the pad 222 aligned with the circular through hole 216 and the upper plate 21 is connected to the lower plate 22 by a bolt 23 with a C-shaped guard plate 27 disposed therebetween. When the clamp 20 clamps the leaf of a desk, a pair of cushions 25 and 26 respectively engaged between the arcuate thin portion 213 of the upper plate 21 and the upper surface of the leaf 40 and the arcuate thin portion 221 of the lower plate 22 and the underside of the leaf 40 of the desk. If the tubular upright 30 is becoming oblique after mounting the apparatus as described the above, both the bolt 23 and a pair of the adjustable threaded rods 24 are rotatable to get the upright 30 becoming straight up. The pair of the cushions 25 and 26 not only intensify the clamping strength but also prevent the components from directly touch the surfaces of the leaf so as to provent the surfaces of the leaf from damaged. The bolt 23 and the threaded rods 24 are all hid in the clamping plates 21 and 22, so as to give the clamp 20 a beautiful outlook. The tubular upright is capable of mounting a LCD screen 50 (as shown in FIG. 7), a document board 60 (as shown in FIG. 8) and/or a book tray 70 (as shown in FIG. 9) which requires two clamp 20 to support.

In conclusion, the clamping stand 20 of the present invention has the following features:

a) the bolt 23 and the threaded rod 24 not directly touch the surfaces of the leaf 40 of a desk so as to keep the leaf 40 from damaged, b) the thin arcuate portions 213 and 221 are big enough to stably clamp the leaf 40, c) the thick straight portions 215 and 225 engage the edges of the leaf 40 that ensure the tubular upright 30 to be straight relative to the surface plane of the leaf 40, d) both the bolt 23 and the threaded rods 24 are covered up by the C-shaped guard plate 27 that provide a uniform outlook, and e) when the tubular upright 30 is found oblique, rotate the threaded rods clockwise or counterclockwise to adjust it back to right position.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. An improved clamping stand comprising:

a clamp having a pair of corresponding upper and lower clamping plates each including an arcuate thin portion, a straight thick portion integrated with a rectangular pad thereon, wherein said upper plate includes a circular through hole in a center of the straight portion and a pair of screw holes on two lateral sides of the circular through hole extending through the pad and a plurality of through holes formed spaced apart in a center of the arcuate thin portion, said lower plate includes a screw hole in a center of the straight thick portion through the pad and aligned with the circular through hole and a pair of through holes on two lateral sides of the screwhole aligned with the screw holes of said upper clamping plate respectively, said upper clamping plate connecting said lower clamping plate by a bolt and a pair of adjustable threaded rods respectively with a C-shaped safety plate engaged therebetween;

a tubular upright having a plurality of screw holes formed spaced apart in a blocked lower end thereof aligned with the through holes of said upper clamping plate and fastened by screws;

a pair of identical cushions having a shaped corresponding to the arcuate thin portions of said upper and lower clamping plates;

when said clamping stand clamps the leaf of a desk, said cushions are respectively disposed between surfaces of said leaf and said upper and lower clamping plates, such that said bolt and said pair of threaded rods are then fastened respectively.

2. The clamping stand as recited in claim 1, wherein adjustment of said pair of threaded rods enable angular adjustment of said tubular upright.

3. The clamping stand as recited in claim 1, wherein one or more of said tubular uprights are provided for supporting a LCD screen, a document board and/or a book tray.

* * * * *